Patented Feb. 7, 1939

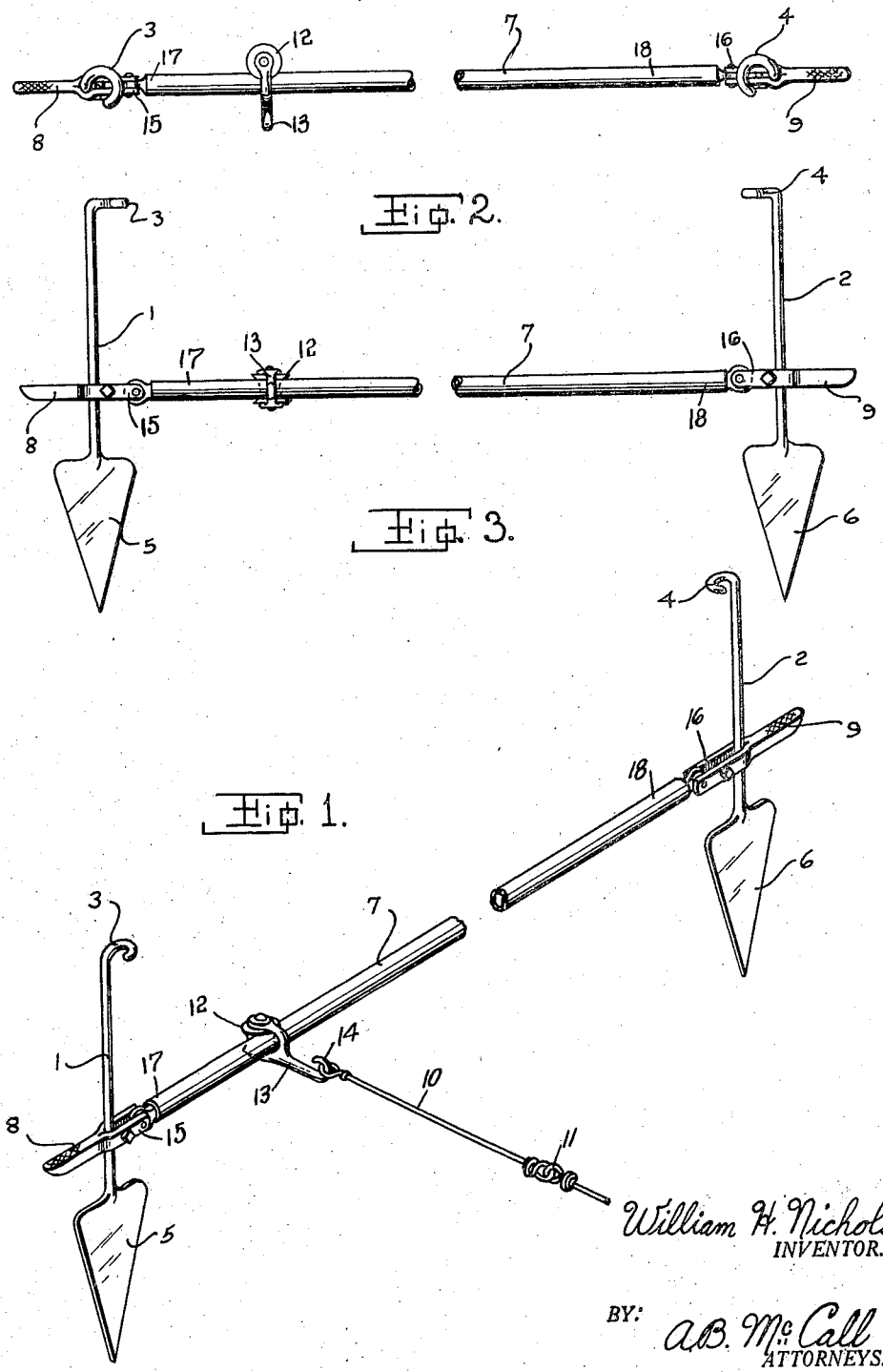

2,145,991

UNITED STATES PATENT OFFICE 2,145,991

DOUBLE STAKER FOR CHECK ROWER PLANTERS

William H. Nichols, Lanesville, Ill.

Application May 16, 1935, Serial No. 21,773

1 Claim. (Cl. 111—49)

My invention relates to grain planters and more especially to check rower planters where a wire is stretched across a field for actuating a grain planter so that the hills of grain will be spaced in uniform spaced relation and check rowed in either direction; an object being in my invention to provide means for permitting the grain to be planted straight out to the end of the row at either end of the grain field.

A further purpose of my invention is to provide a double staker for the check rower wire operating the grain planter so that at each end of the field the wire will be detachably secured to a pulley on a rod in a manner that will permit the wire to operatively check row the grain that is being planted closely up to the end of the field as the planter approaches the end of the row, and then with such an invention permit the operator from time to time as needed, to move the double staker in successive steps as the planting progresses in a true and satisfactory alignment across the end of the field to provide straight rows and have them check rowed clear up to the end of the row for the entire field.

A particular purpose of my invention is to provide a double staker for the grain planter to be used at each end of a grain field for the operative support of a check rower wire so that a two row or four row planter or a planter that may plant more than four rows at a time, may be used successfully and when in normal operation with my invention, may plant the grain rows close up to the end of the row with the complete and satisfactory operation of the check rower wire up to the end when actuating the planter.

I attain the objects of my invention by the device described in the annexed specification, recited in the claim and illustrated in the accompanying drawing, in which like reference numerals indicate like parts in the several figures.

Referring to the figures:

Fig. 1 is a perspective of a detail of my invention showing a check rower wire operatively connected therewith.

Fig. 2 is the top view of my invention.

Fig. 3 is a side view of my invention.

My invention is a new and practical article of manufacture for the aid of farmers in facilitating the planting of grain in the fields where it is desired to check row the grain and particularly where, as in most cases, it will be desired to check row the grain rows clear up to the end of the field at each end of the row whether the planting is being done by a two row planter or four row or a planter adapted to plant more than four rows at a time.

For instance, in the past, those who desired to plant the grain in check rows had the check rower wire secured to a single stake at each end of the field, making it impossible to use such a wire clear up to the end of the field as the planter approaches the end, since the end of the wire secured to the stake could not leave the same to move over to the planter mechanism to actuate the same as the planter approaches the end of the grain row; but with my invention, I have provided a device which will permit the planter in check rowing the grain to be operated close up to the end of the row and still check row the grain as straight and accurately as it did in the middle of the field whether a two row or a four row planter is used; or if desired, a planter of greater capacity could be used.

My invention and its practical adaptation has for an object to provide means by which the check rower wire at each end of the grain rows may be secured to a pulley adapted to roll on a rod pivotally secured at each end to stakes pressed into the ground so that when the planter approaches the end then the check rower wire may move with the pulley over toward the planter permitting the wire to be where it is needed in actuating the planter without undue strain on a wire and without difficulty in the manipulation of the planter at the end of the grain field.

In a detailed study of my invention and the method of using the same, it will be noted that I provide a pair of ground stakes 1 and 2 preferably provided with integral handles 3 and 4 at the top and each provided with tapered stabilizing plates 5 and 6 at the bottom.

I have provided a rod or bar 7 which is preferably connected to ground stakes 1 and 2 by hinge or pivotal connection and rods 1 and 2 are shoved down in the ground by holding to handles 3 and 4 respectively as the operator's weight is pressed down upon foot pedals 8 and 9, each respectively, shaped to define supporting yokes 15 and 16, which pivotally engage the respective ends 17 and 18 of rod 7.

It is obvious that when stabilizing plates 5 and 6 on stakes 1 and 2 respectively are shoved into the ground, these plates will have a tendency to prevent these stakes from bending over toward the field under strain, due to the planting operation when wire 10 with its series of uniformly spaced knots 11 are being used for tripping a grain releasing lever on a grain planter (not shown).

For instance, wire 10, when the operator starts out on planting the field, is laid across the field and is supported at one end by a pulley 12 being detachably connected to a yoke 13 by a hook 14 while at the other end of this wire a similar pulley is likewise mounted on a bar corresponding to bar 7; thus permitting wire 10 to be held at its respective ends in proper position across the field to let the same effectively actuate a planter when it is moving from one end of the field to the other.

Thus, it will be observed that wire 10 will lay on the ground from one end of the field to the other along the side of the field where the planting is started so as to be in position to permit knots 11 of wire 10 to release the grain from grain containers on a grain planter as the same moves from one end of the field to the other.

When a four row planter starts to cross the field, wire 10 will actuate the grain releasing mechanism in the same way that it does the two row planter and in other respects the use of my invention is the same with the four row planter as with the two row planter, with the exception that when moving my double staker when necessary at the ends of the field, it is obvious that the stakes and bar will need to be moved further over at each move than is required for a two row planter.

For instance, when moving my double staker over to a new position in alignment with its former position this staker with its rod is located far enough over from its former position to permit it to be placed behind the planter, which will make it approximately four grain row spaces, when considering whatever space may be used between the grain rows.

In like manner, a planter which may plant more than four rows at a time would have the double staker re-set behind it when starting out.

Having thus described the nature of my invention, what I claim is:

As a new article of manufacture a double staker for check rower planters comprising in cooperative combination a pair of spaced post members each shaped to define, at the lower end, a flattened ground terminal, at the top end shaped to define a coiled terminal horizontally disposed for receiving hand pressure and an upright rod intermediate the top and bottom portions, a horizontally disposed yoke about said upright intermediate portion of each of said posts and a horizontal pulley bar, extending between said yokes on said posts respectively and pivotally engaging the inner ends of said yokes respectively, a pulley operatively rotatable on said pulley bar and a yoke, holding said pulley on the bar and having its free end shaped to define a hook for the detachable engagement of a check rower wire; whereby said check rower wire may be controllably connected with a corn planter and in connection with said double staker permitted to move through its connection with said pulley into proper alignment at the end of a corn row as a corn planter approaches the end of a field.

WILLIAM H. NICHOLS.